(12) United States Patent
Sung et al.

(10) Patent No.: US 12,147,043 B2
(45) Date of Patent: Nov. 19, 2024

(54) APPARATUS, SYSTEM, AND METHOD FOR DISPOSING PHOTONIC INTEGRATED CIRCUITS ON SURFACES

(71) Applicant: META PLATFORMS TECHNOLOGIES, LLC, Menlo Park, CA (US)

(72) Inventors: Poer Sung, Woodinville, WA (US); Guohua Wei, Redmond, WA (US); Tingling Rao, Bellevue, WA (US); Lafe Joseph Purvis, II, Redmond, WA (US); Kimberly Kay Childress, Duvall, WA (US); Arman Boromand, Issaquah, WA (US); Andrew John Ouderkirk, Kirkland, WA (US); Matthew E Colburn, Woodinville, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 180 days.

(21) Appl. No.: 17/672,444

(22) Filed: Feb. 15, 2022

(65) Prior Publication Data
US 2022/0342219 A1 Oct. 27, 2022

Related U.S. Application Data

(60) Provisional application No. 63/179,953, filed on Apr. 26, 2021.

(51) Int. Cl.
*G02B 27/01* (2006.01)
*G02B 6/12* (2006.01)
(Continued)

(52) U.S. Cl.
CPC ..... *G02B 27/0172* (2013.01); *G02B 6/12004* (2013.01); *G02B 6/122* (2013.01);
(Continued)

(58) Field of Classification Search
CPC ............ G06F 1/163; G02B 2027/0178; G02B 27/0172; G02B 27/0093; G02B 27/017;
(Continued)

(56) References Cited

U.S. PATENT DOCUMENTS 5,172,385 A * 12/1992 Forrest ..................... H01S 5/026
385/11
10,466,483 B2 * 11/2019 Quere ................. G02B 27/0172
(Continued)

FOREIGN PATENT DOCUMENTS

| CN | 106164754 A | * | 11/2016 | ......... G02B 27/0172 |
| CN | 107807419 A | * | 3/2018 | ................ G02B 6/13 |

(Continued)

OTHER PUBLICATIONS

English Translation of CN 107807419 A (Year: 2018).*
(Continued)

*Primary Examiner* — Balram T Parbadia
*Assistant Examiner* — Mary A El-Shammaa
(74) *Attorney, Agent, or Firm* — Greenberg Traurig, LLP

(57) ABSTRACT

A system comprising (1) at least one optical element having a nonplanar surface, (2) at least one photonic integrated circuit disposed on the nonplanar surface of the optical element, the photonic integrated circuit comprising (A) an optical core that contains an optically anisotropic organic material and (B) a cladding disposed over the optical core. Various other apparatuses, systems, and methods are also disclosed.

20 Claims, 12 Drawing Sheets

(51) Int. Cl.
  *G02B 6/122* (2006.01)
  *G02B 27/00* (2006.01)
  *G06F 1/16* (2006.01)

(52) U.S. Cl.
  CPC .. *G02B 27/0093* (2013.01); *G02B 2027/0178* (2013.01); *G06F 1/163* (2013.01)

(58) Field of Classification Search
  CPC .. G02B 6/12004; G02B 6/122; G02B 6/1221; G02B 2006/12069
  See application file for complete search history.

(56) References Cited

U.S. PATENT DOCUMENTS

| | | | | |
|---|---|---|---|---|
| 10,527,854 | B1 * | 1/2020 | Trail | G02B 27/0081 |
| 10,564,428 | B2 * | 2/2020 | Silver | G02B 27/0172 |
| RE48,379 | E * | 1/2021 | Ho | G02B 6/43 |
| 11,448,815 | B2 * | 9/2022 | Koshelev | G02B 6/0055 |
| 11,561,405 | B1 * | 1/2023 | Sharma | G02B 5/208 |
| 2017/0108697 | A1 * | 4/2017 | El-Ghoroury | G02B 27/0081 |
| 2017/0293145 | A1 * | 10/2017 | Miller | G02B 27/0172 |
| 2020/0264371 | A1 * | 8/2020 | Bhargava | G02B 6/1221 |
| 2021/0103087 | A1 * | 4/2021 | Wei | G02B 27/0172 |

FOREIGN PATENT DOCUMENTS

| | | | | |
|---|---|---|---|---|
| CN | 108732749 | A * | 11/2018 | |
| CN | 109154720 | A * | 1/2019 | G02B 27/01 |
| CN | 111226157 | A * | 6/2020 | G02B 27/0081 |
| CN | 115087898 | A * | 9/2022 | G02B 1/045 |
| WO | WO-9407287 | A1 * | 3/1994 | G02B 6/43 |
| WO | WO-2016075689 | A1 * | 5/2016 | G02B 27/0172 |
| WO | WO-2020180612 | A1 * | 9/2020 | |
| WO | WO-2023165786 | A1 * | 9/2023 | G06N 10/40 |

OTHER PUBLICATIONS

International Search Report and Written Opinion for International Application No. PCT/US2022/026226, mailed Jul. 13, 2022, 12 pages.

Naumov P., et al., "The Rise of the Dynamic Crystals," Journal of the American Chemical Society, vol. 142, No. 31, Jun. 19, 2020, pp. 13256-13272.

Zhang C., et al., "Optical Waveguides at Micro/Nanoscale based on Functional Small Organic Molecules," Physicalchemistry Chemical Physics, vol. 13, No. 20, Jan. 1, 2011, 14 pages.

International Preliminary Report on Patentability for International Application No. PCT/US2022/026226, mailed Nov. 9, 2023, 10 pages.

* cited by examiner

APPARATUS, SYSTEM, AND METHOD FOR DISPOSING PHOTONIC INTEGRATED CIRCUITS ON SURFACES

INCORPORATION BY REFERENCE

This application claims the benefit of priority under 35 U.S.C. § 119(e) to U.S. Provisional Application No. 63/179,953, filed Apr. 26, 2021, the contents of which are incorporated herein by reference in their entirety.

BRIEF DESCRIPTION OF DRAWINGS AND APPENDIX

The accompanying Drawings illustrate a number of exemplary embodiments and are parts of the specification. Together with the following description, the Drawings demonstrate and explain various principles of the instant disclosure.

Figure 11:
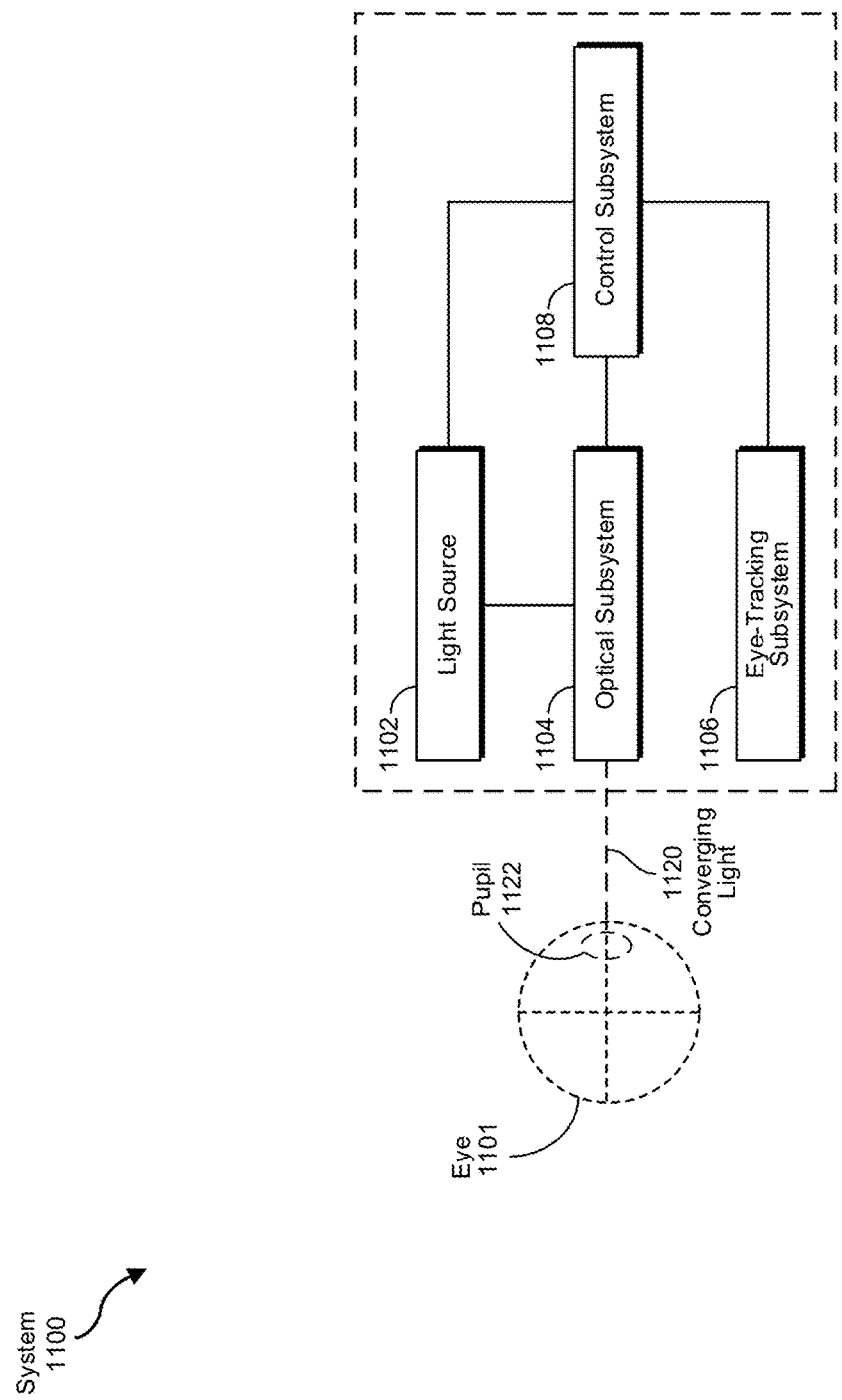

FIG. 11 an illustration of an exemplary system that incorporates an eye-tracking subsystem capable of tracking a user's eye(s).

Figure 12:
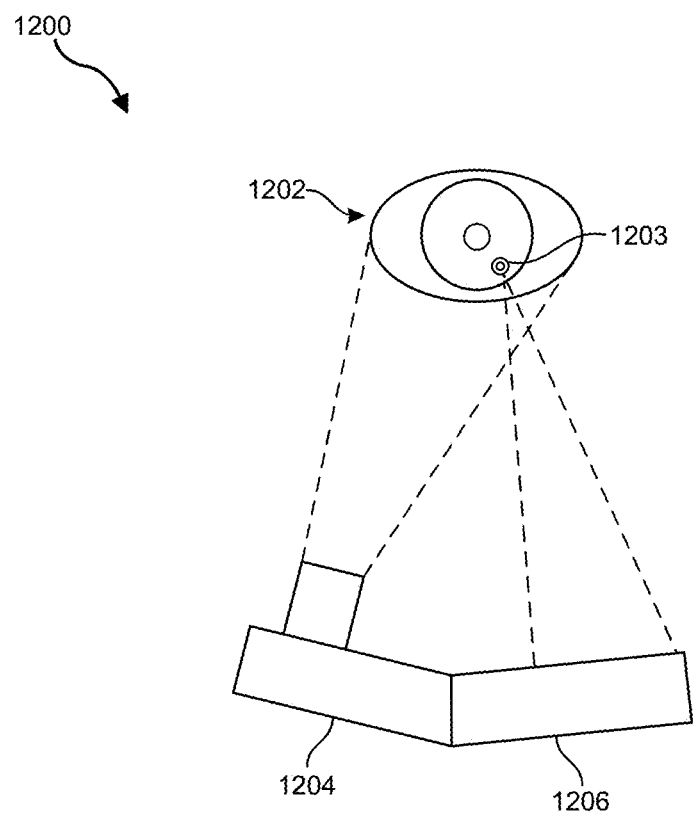
Figure 12:
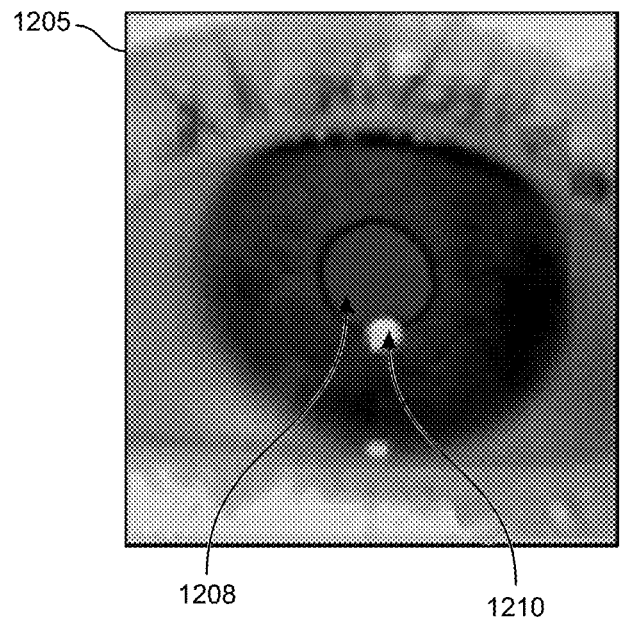

FIG. 12 is a more detailed illustration of various aspects of the eye-tracking subsystem illustrated in FIG. 11.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION

The present disclosure is generally directed to apparatuses, systems, and methods for disposing photonic integrated circuits (PICS) on planar or nonplanar surfaces. As will be explained in greater detail below, these apparatuses, systems, and methods may provide numerous features and benefits.

Organic materials may be incorporated into a variety of different optic and/or electro-optic device architectures, including active or passive optics and/or electroactive devices. Due to their lightweight and conformability, one or more organic layers may be incorporated into wearable devices such as smart glasses. Such organic layers may be attractive candidates for emerging technologies like virtual and/or augmented reality devices where a comfortable, adjustable form factor is desired.

In some examples, virtual reality (VR) and augmented reality (AR) eyewear devices or headsets may enable users to experience events, such as interactions with people in a computer-generated simulation of a three-dimensional world and/or viewing data superimposed on a real-world view. By way of example, superimposing information onto a field of view may be achieved through an optical head-mounted display (OHMD) and/or by using embedded wireless glasses with a transparent heads-up display (HUD) or AR overlay. VR/AR eyewear devices and headsets may be used for a variety of purposes. For example, governments may use such devices for military training, medical professionals may use such devices to simulate surgery, and/or engineers may use such devices as design visualization aids.

These and other applications may leverage one or more characteristics, including the refractive index, of optically anisotropic organic materials to manipulate light. Notwithstanding recent developments, for use in such devices and systems, it would be advantageous to provide organic or other dielectric materials to achieve improved optical and mechanical properties.

As disclosed herein, a class of optically anisotropic organic materials may be incorporated into a variety of PICs and corresponding components, including lenses, gratings, filters, waveguides, crossing structures, tapers, directional couplers, and/or beam splitters. In certain embodiments, PICs may be coupled to and/or disposed on an optical element located within the transparent aperture of an optical device such as a lens. By way of example, such an optical element may be incorporated in tunable lenses, accommodative optical elements, adaptive optics, VR/AR eyewear devices, and/or OHMDs.

In some examples, PICs may be configured to integrate two or more photonic functions that carry information signals imposed on optical wavelengths typically in the visible and near infrared spectrums. PICs may include and/or represent passive and/or active components that form an integrated electro-optical-mechanical system.

In some examples, a passive component of a PIC may include and/or represent a core layer and a cladding layer. In such examples, the cladding layer may be disposed over the core layer, and the refractive index of the core layer may be greater than the refractive index of the cladding layer. Although inorganic materials (such as inorganic thin film crystals and/or inorganic amorphous thin films) and/or organic polymers may be used to form passive components in PICs, such inorganic materials and/or organic polymers may be unable to provide and/or achieve various advantages and/or features offered by optically anisotropic organic materials.

For example, some inorganic materials and/or organic polymers may be unable to provide a birefringence and/or a refractive index as high as optically anisotropic organic materials. As a result, such inorganic materials and/or organic polymers may perform poorer than optically anisotropic organic materials as PICs in certain optical systems, devices, and/or implementations. As another example, some inorganic materials and/or organic polymers may be rigid, brittle, and/or inflexible (especially compared to optically anisotropic organic materials). As a result, such inorganic materials and/or organic polymers may be unable to contour, be shaped to, and/or be disposed on, along, and/or across nonplanar surfaces, such as those incorporated in concave lenses, convex lenses, and/or Fresnel lenses.

In some examples, the optical and mechanical properties of optically anisotropic organic materials may provide a number of advantages for their application in PICs, including mechanical stability under applied loads, mechanical flexibility and fewer realized defects as a result of induced strains, thermal stability, and higher refractive indices than many comparative inorganic and/or polymer materials. These advantages may also include and/or lead to higher operational efficiencies and/or longer lifetimes.

In accordance with various embodiments, an optically anisotropic organic material may be incorporated into a passive or active component of a photonic integrated circuit. The optically anisotropic organic material may include uniaxially oriented or biaxially oriented crystallites or glasses. In some embodiments, optically anisotropic organic materials may include and/or represent a preferred molecular packing, orientation, and/or alignment of molecules to achieve certain characteristics and/or attributes. The optically anisotropic organic materials may include and/or represent crystalline (e.g., a single crystal), partially crystalline, and/or amorphous materials (e.g., anisotropic glasses).

Features from any of the embodiments described herein may be used in combination with one another in accordance with the general principles described herein. These and other embodiments, features, and advantages will be more fully understood upon reading the following detailed description in conjunction with the accompanying drawings, appendices, and claims.

The following will provide, with reference to FIGS. 1-7, detailed descriptions of various apparatuses, devices, systems, components, and/or implementations capable of facilitating the disposition of PICs on nonplanar surfaces. The discussion corresponding to FIG. 8 will provide detailed descriptions of an exemplary method for disposing PICs on nonplanar surfaces. The discussion corresponding to FIGS. 9-12 will provide detailed descriptions of types of exemplary artificial-reality devices, wearables, eye-tracking devices, and/or associated systems that may incorporate PICs with optically anisotropic organic materials.

Figure 1:
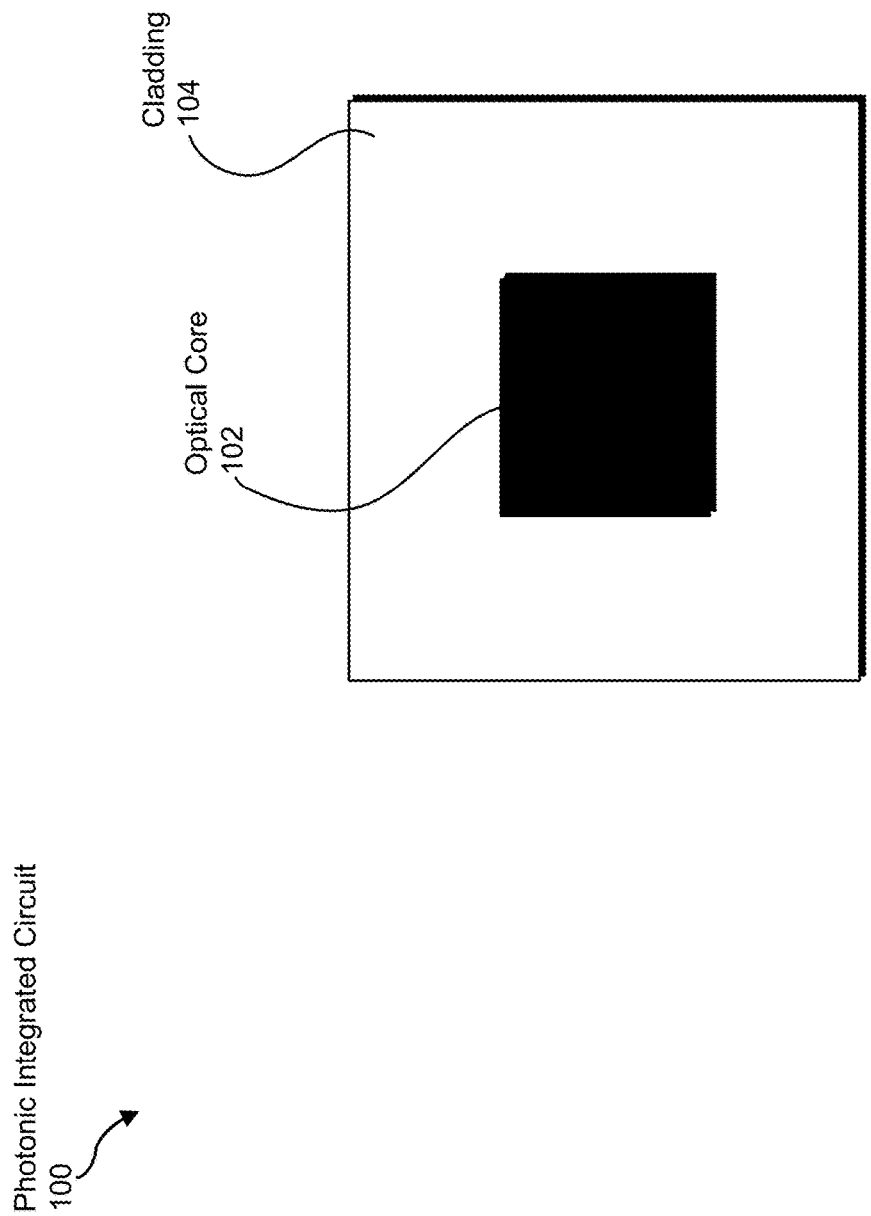
FIG. 1 is an illustration of an exemplary photonic integrated circuit capable of being disposed on surfaces according to one or more embodiments of this disclosure.
Figure 2:
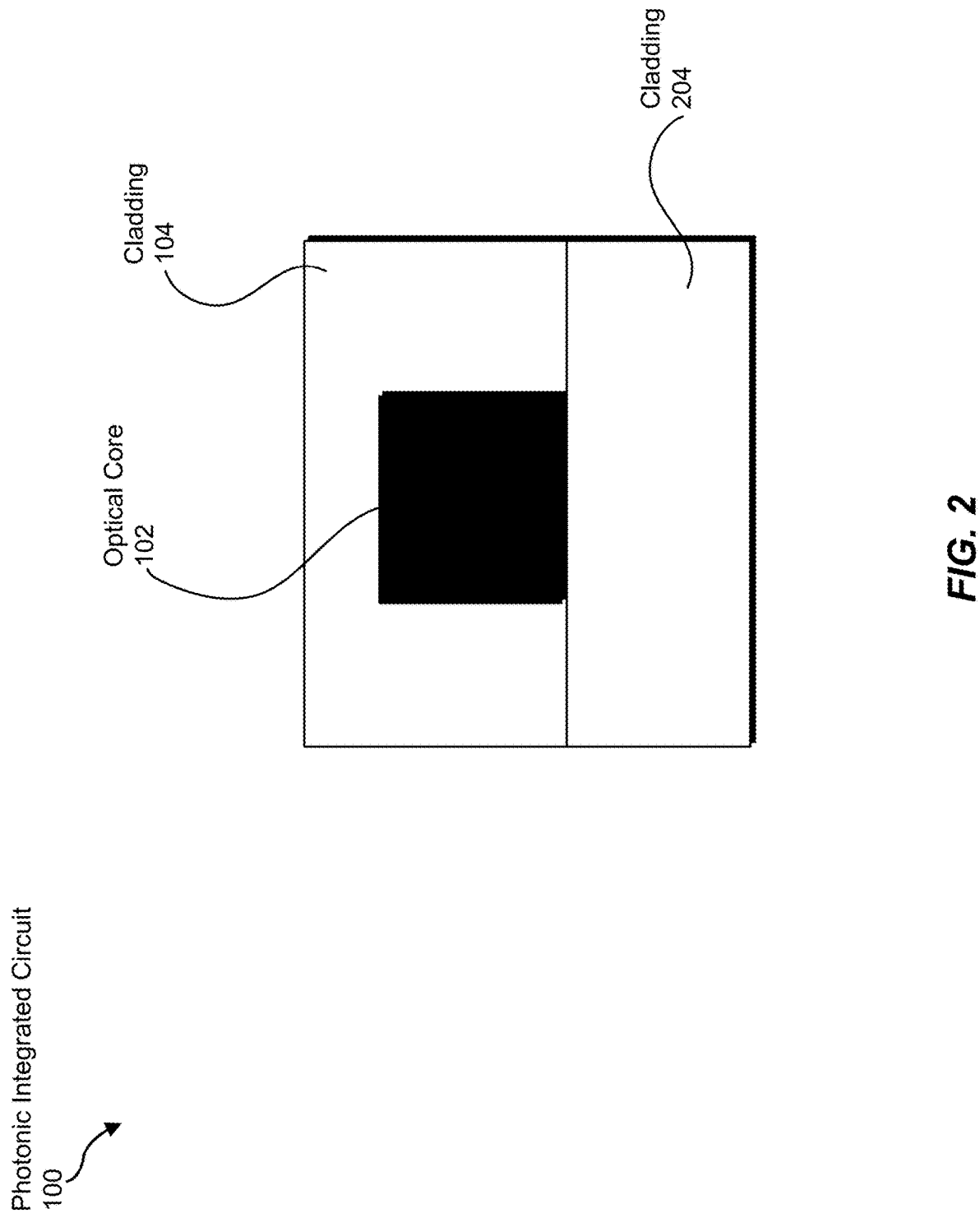
FIG. 2 is an illustration of an exemplary photonic integrated circuit capable of being disposed on surfaces according to one or more embodiments of this disclosure.
Figure 3:
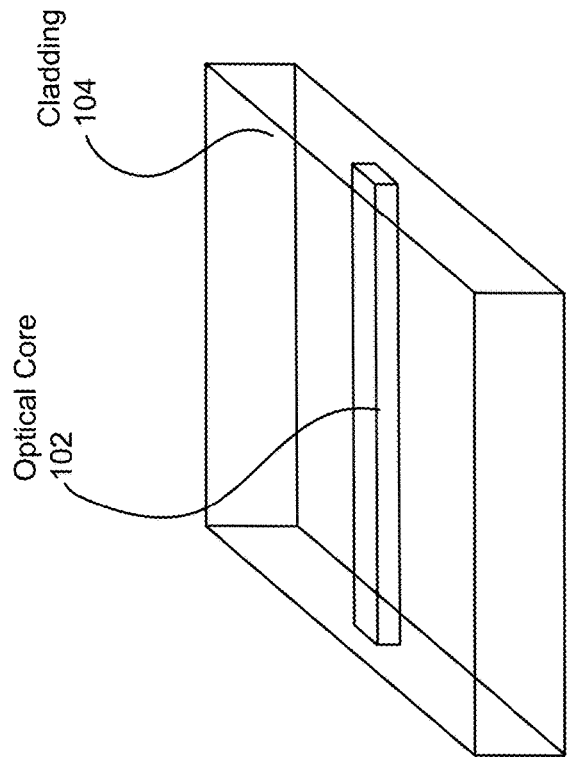
FIG. 3 is an illustration of an exemplary photonic integrated circuit capable of being disposed on surfaces according to one or more embodiments of this disclosure.

FIGS. 1-3 illustrate an exemplary PIC 100 that includes an optically anisotropic organic material. As illustrated in FIGS. 1-3, exemplary PIC 100 may include and/or represent an optical core 102 and/or cladding 104. In some examples, optical core 102 may include, contain, and/or represent an optically anisotropic organic material. Additionally or alternatively, cladding 104 may include, contain, and/or represent an optically anisotropic organic material. In any case, cladding 104 may cover, envelope, and/or be disposed over optical core 102.

Optical core 102 may include and/or form any of a variety of shapes. In some examples, optical core 102 may include and/or represent any shape capable of guiding optical waves. In one example, optical core 102 may represent and/or form a square shape. Examples of such shapes include, without limitation, rectangles, quadrilaterals, triangles, circles, ellipses, slots formed by two rectangles, pentagons, combinations of one or more of the same, and/or any other suitable shapes.

In some examples, the optically anisotropic organic material may be characterized by a uniaxially-oriented or biaxially-oriented index of refraction. In one example, a maximum refractive index of the optically anisotropic material may reach at least 1.6, at least 1.8, at least 2.0, and/or at least 2.2. In certain applications, the performance of the PIC may increase as the refractive index of the optically anisotropic organic material increases. In other words, the higher the refractive index of the optically anisotropic organic material, the better the PIC may perform.

In one example, a birefringence of the optically anisotropic material may reach at least 0.5, at least 0.7, at least 0.9, at least 0.11, at least 0.13, at least 0.15, at least 0.17, and/or at least 0.19. In certain applications, the performance of the PIC may increase as the birefringence of the optically anisotropic organic material increases. In other words, the higher the birefringence of the optically anisotropic organic material, the better the PIC may perform.

In some examples, the optically anisotropic organic material may provide polymer and other organic solid materials that promote improved optical properties, such as a controllable refractive index and/or birefringence, optical clarity, and/or optical transparency. In one example, the optically anisotropic organic material may be formed and/or incorporated into thin films. In addition, a plurality of such thin films may be stacked together to form a multilayer thin film.

In some examples, a multilayer thin film may include and/or represent a plurality of organic solid crystal layers. In one example, this multilayer thin film may include and/or represent a part and/or component of an optical device and/or system. By way of example, a lens system with a circular reflective polarizer may include and/or incorporate a multilayer organic solid thin film. In this example, the multilayer thin film may include and/or represent a plurality of biaxially oriented organic solid material layers. Each biaxial layer may be characterized by three mutually orthogonal refractive indices ($n_1$, $n_2$, $n_3$) where $n_1 \ne n_2 \ne n_3$.

According to certain embodiments, a multilayer organic solid thin film may be incorporated into a circular reflective polarizer for use in display systems to provide high broadband efficiency and/or high off-axis contrast. By misaligning and/or rotating each layer with respect to an adjacent layer, such biaxially oriented multilayer thin films may facilitate higher signal efficiency and/or greater ghost image suppression than architectures using comparative inorganic materials. In addition, organic solid thin films may be implemented in various projectors to enhance and/or improve brightness.

Various optically anisotropic organic materials may be used to form and/or create an organic solid thin film. Examples of such optically anisotropic organic materials may include various classes of crystallizable organic semiconductors. For example, organic semiconductors may include and/or represent small molecules, macromolecules, liquid crystals, organometallic compounds, oligomers, polymers, p-type, n-type, and/or ambipolar polycyclic aromatic hydrocarbons (such as anthracene, phenanthrene, carbon 60, pyrene, corannulene, fluorene, biphenyl, ter-phenyl, etc.). Some organic semiconductors may include and/or represent cyclic, linear, and/or branched structures, whether saturated or unsaturated. Additionally or alternatively, some organic semiconductors may include and/or represent heteroatoms and/or saturated or unsaturated heterocycles (such as furan, pyrrole, thiophene, pyridine, pyrimidine, piperidine, etc.). Such heteroatoms may include and/or represent fluorine, chlorine, nitrogen, oxygen, sulfur, phosphorus, as well as various metals. Suitable feedstock for molding solid organic semiconductor materials may include and/or represent neat organic compositions, melts, solutions, and/or suspensions containing one or more of the organic materials disclosed herein.

Structurally, the disclosed organic materials, as well as the thin films derived therefrom, may be single crystal, polycrystalline, and/or glassy. In one example, organic solid crystals may include closely packed structures (e.g., organic molecules) that exhibit desirable optical properties such as a high and/or tunable refractive index or birefringence. Anisotropic organic solid materials may include a preferred packing of molecules and/or a preferred orientation or alignment of molecules.

In some examples, organic solid crystal materials may support, facilitate, and/or provide functionalities, including phase modulation, beam steering, wave-front shaping and correction, optical communication, optical computation, holography, and the like. Due to their optical and mechanical properties, organic solid crystal materials may be incorporated into passive or active optics (such as AR/VR headsets) and/or replace comparative material systems (such as polymers, inorganic materials, and liquid crystals) in some applications. In certain aspects, organic solid crystals may have optical properties that rival those of inorganic crystals while exhibiting the processability and electrical response of liquid crystals.

Due to their relatively low melting temperature, organic solid crystal materials may be molded to form a desired structure. Such molding processes may facilitate complex architectures that are more economical than the cutting, grinding, and/or polishing of bulk crystals. In one example, a single crystal or polycrystalline shape (such as a sheet or cube) may be partially or fully melted into a desired form and then controllably cooled to form a single crystal having a new shape.

In some examples, a process of forming a PIC component with an optically anisotropic organic material may include and/or involve thermal molding, thermal imprinting, patterning, and/or etching. Thermal molding and thermal imprinting processes may utilize a mold surface with a pattern that is an inverse reciprocal structure of the PIC component to be formed. In contrast, patterning and etching processes may utilize a planar or nonplanar structure and/or surface.

In some examples, one method of forming a PIC component with an optically anisotropic organic material may include and/or involve generating and/or creating a core layer and a cladding layer disposed over the core layer. In other examples, one method of forming a PIC component with an optically anisotropic organic material may include and/or involve creating and/or generating a cladding layer and a core layer embedded within the cladding layer. In one example, a method of forming a PIC component with an optically anisotropic organic material may include and/or involve vapor deposition, imprinting, and/or thermal growth.

Imprinting and/or etching techniques may be used to form a passive component following a molding process. In addition, a thermal growth method may be used in conjunction with a mold having a predetermined shape (e.g., certain textures, structures, thickness, curvature, etc.). Curvature may be created by directly patterning a PIC component/layer over a curved and/or nonplanar substrate, by forming a PIC component/layer over a planar substrate followed by thermal or mechanical bending, and/or by forming a PIC component/ layer over a flexible substrate followed by lamination onto a curved and/or nonplanar substrate.

In a vapor deposition or thermal growth method, an organic solid crystal layer may be formed over a deposition surface of a cladding layer. In some examples, the deposition surface of the cladding layer may be planar or non-planar. In such examples, the deposition surface may be pre-patterned with surface features like trenches or grooves. The organic solid crystal may be formed as a blanket layer that is subsequently patterned and/or etched. Alternatively, a blocking mask may be formed over the deposition surface of the cladding layer, and the organic solid crystal layer may be selectively formed over the cladding layer through openings in the blocking mask.

In an imprinting method, an organic solid crystal layer may be formed over a deposition surface of a cladding layer. The deposition surface of the cladding layer may be planar or non-planar. The imprinting method may include and/or involve a coating step to apply a thin film of an optically anisotropic organic material on the deposition surface of the cladding layer, a filling step in which an optically anisotropic organic material is dispensed into a mold having an inverse reciprocal structure with respect to the core layer, and/or a thermal or solvent annealing step to influence nucleation and/or crystallite growth of the organic material. In one example, the process of molding an optically anisotropic organic material component may include and/or involve control of the kinetics and/or thermodynamics of nucleation or crystal growth.

In certain embodiments, the temperature applied proximate to a nucleation region during molding may be less than a melting temperature ($T_m$) of a molding composition. However, the temperature applied remote from the nucleation region during molding may be greater than the melting temperature. Such a temperature gradient may be achieved in conjunction with a selective melting process (e.g., laser, soldering iron, etc.) to remove excess nuclei, thereby leaving few nuclei (e.g., a single nucleus) for crystal growth.

Crystal growth may be controlled using an isothermal process, slow cooling, and/or zone annealing. In some embodiments, a lubricant may be used to encourage the growth of a single crystal. Examples of such a lubricant include, without limitation, polymers, oligomers, small molecules, combinations or variations of one or more of the same, and/or any other suitable lubricants. Such a lubricant may be characterized by a melting temperature that is at least 20° C. less than the melting temperature of the molding composition.

In some examples, a suitable mold may be formed from a polymer characterized by a softening temperature and/or a glass transition temperature ($T_g$) greater than the melting temperature ($T_m$) of the molding composition. In one example, a lubricant and/or releasing agent (e.g., fluorinated groups, silicones, hydrocarbon chains, etc.) may be applied to an internal surface of the mold and/or combined with the molding composition. Additional materials may be applied to an internal surface of the mold to decrease interactions between the mold and the molding composition. The internal surface of the mold may be treated with chemical bonding and/or physical absorption of small molecules as well as polymers/oligomers having linear, branched, dendritic, or ringed structures terminated, for example, with fluorinated groups, silicones, and/or hydrocarbon groups.

The optically anisotropic organic materials disclosed herein may be incorporated into a variety of optical systems and devices. For example, such materials may be incorporated into waveguides and/or grating architectures. In this example, components made of those materials may be optically transparent.

As used herein with reference to a material or element, the term "transparent" or "optically transparent" may exhibit a transmissivity within the visible light spectrum of at least 80% (e.g., approximately 80, 90, 95, 97, 98, 99, or 99.5% transmissivity, etc.) and less than 5% bulk haze (e.g., approximately 0.1, 0.2, 0.4, 1, 2, or 4% bulk haze, etc.). Transparent materials may typically exhibit very low optical absorption and/or minimal optical scattering.

In some examples, the numerical values specified herein may constitute and/or represent approximations. In one example, the term "approximation," as used herein, may mean and include the stated value as well as all values within 10% of the stated value. Thus, by way of example, reference to the numeric value "50" may constitute and/or represent an approximation that includes values equal to 50±5 (e.g., values within the range 45 to 55).

As used herein, the terms "haze" and "clarity" may refer to an optical phenomenon associated with the transmission of light through a material. In some examples, haze and/or clarity may be attributed to the refraction of light within the material (e.g., due to secondary phases or porosity and/or the reflection of light from one or more surfaces of the material). As will be appreciated by those skilled in the art, haze may be associated with an amount of light that is subject to wide angle scattering (e.g., at an angle greater than 2.5° from normal) and a corresponding loss of transmissive contrast. Clarity may relate to an amount of light that is subject to narrow angle scattering (i.e., at an angle less than 2.5° from normal) and an attendant loss of optical sharpness or see-through quality.

In some examples, PIC 100 may include and/or represent different types of cladding disposed over optical core 102. For example, as illustrated in FIG. 2, PIC 100 may include and/or represent a cladding 204 on which optical core 102 is laid, coupled, and/or disposed. In this example, PIC 100 may also include and/or represent cladding 104 that surrounds optical core 102 on one or more sides (e.g., opposite and/or adjacent to cladding 104). One or more of claddings 104 and 204 may have a refractive index that is less than the refractive index of optical core 102. Additionally or alternatively, one or more of claddings 104 and 204 may include and/or represent optically anisotropic organic materials.

In some examples, PIC 100 may include and/or represent one or more passive and/or active components capable of performing and/or providing one or more photonic functions. Examples of such passive components include, without limitation, waveguides, crossing structures, tapers, directional couplers, optical couplers, beam splitters, gratings, Mach-Zehnder Interferometers (MZIs), optical fibers, combinations or variations of one or more of the same, and/or any other suitable passive components. Examples of such active components include, without limitation, optical modulators, phase shifters, optical switches, optical gates, light detection and ranging (LIDAR) devices, lasers, photodiodes, optical resonators, photonic crystals, eye-tracking devices, light-emitting devices, combinations or variations of one or more of the same, and/or any other suitable active components.

Figure 5:
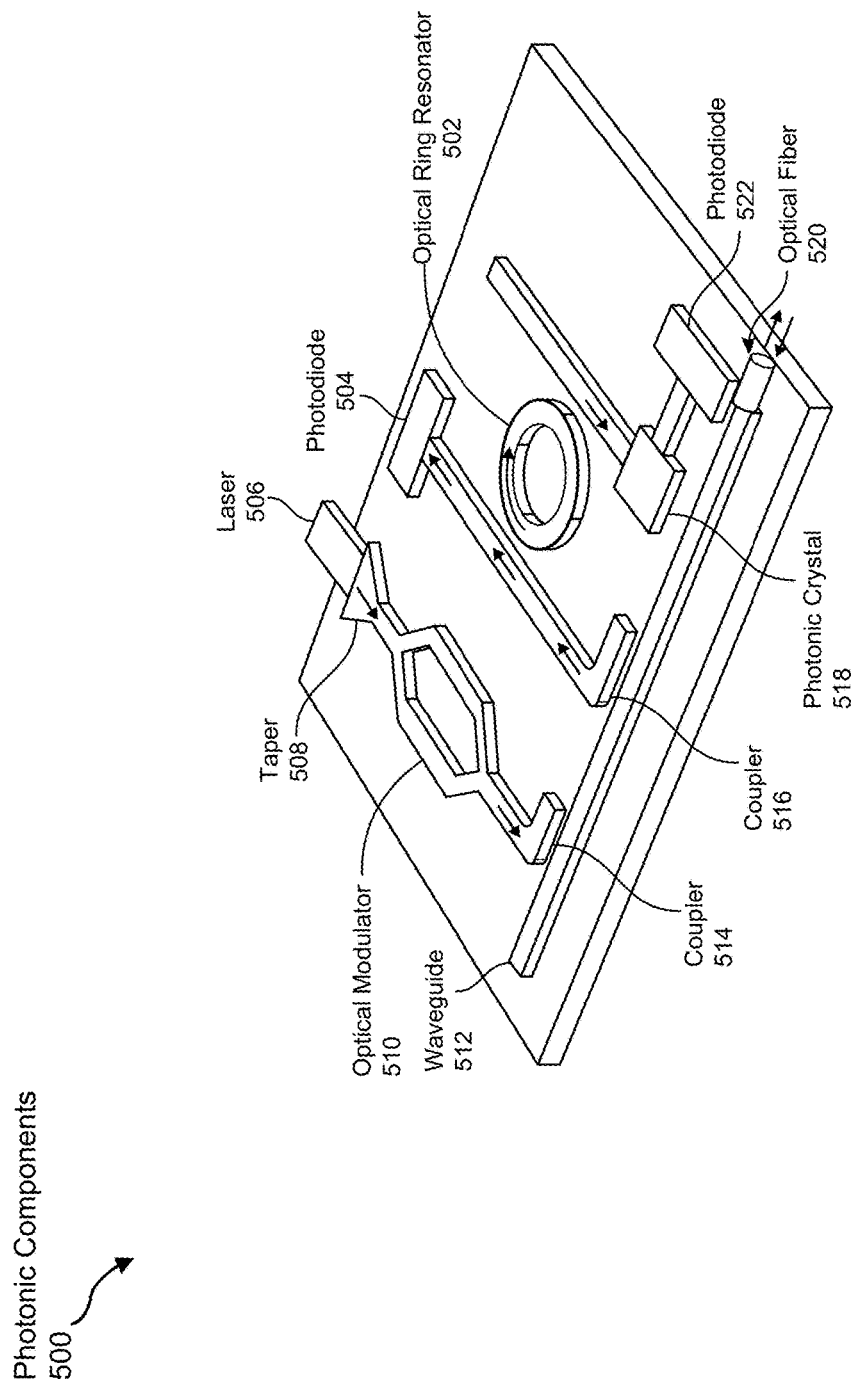
FIG. 5 is an illustration of exemplary photonic components capable of being implemented via optically anisotropic organic materials according to one or more embodiments of this disclosure.
Figure 6:
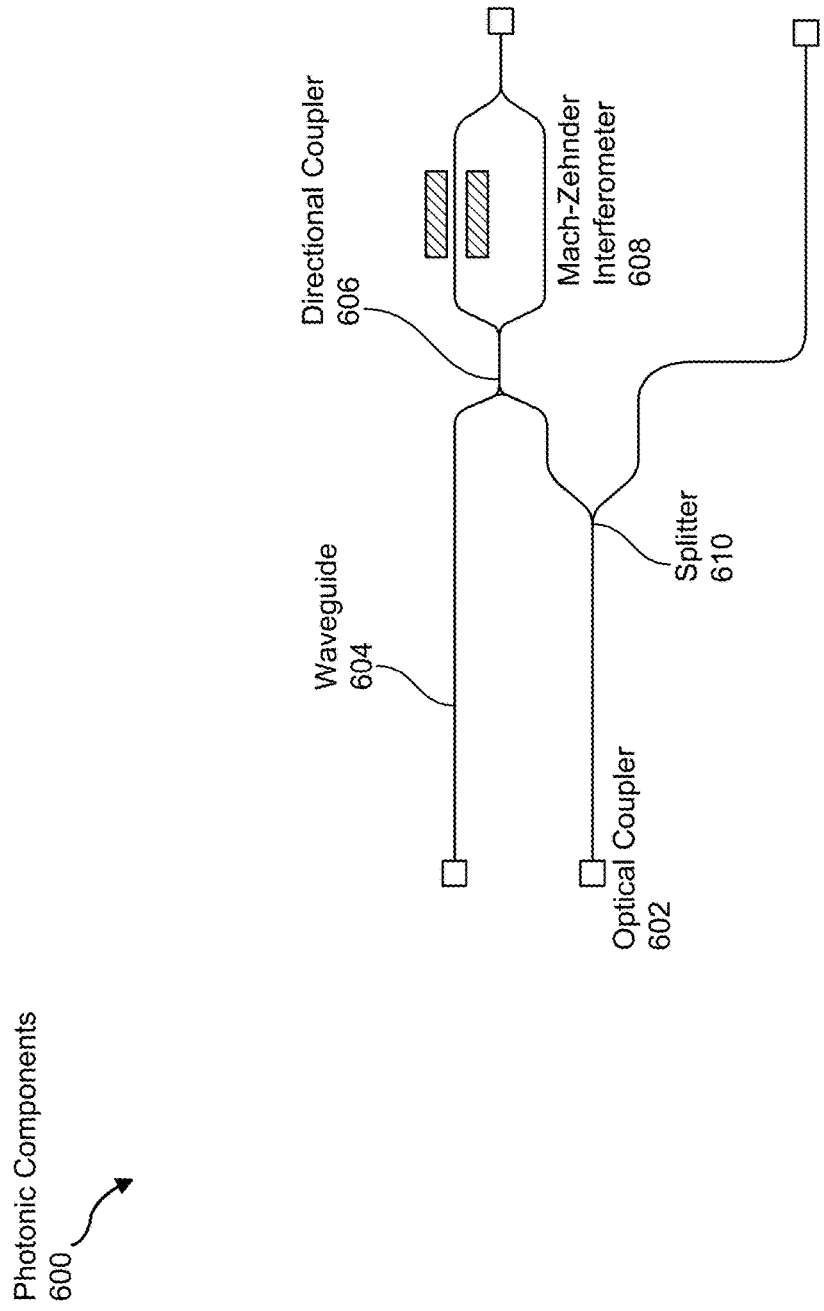
FIG. 6 is an illustration of exemplary photonic components capable of being implemented via optically anisotropic organic materials according to one or more embodiments of this disclosure.

FIGS. 5 and 6 illustrate graphical and/or schematic representations of photonic components 500 and 600, respectively, capable of being implemented on and/or as part of PIC 100. As illustrated in FIG. 5, photonic components 500 may include and/or represent an optical ring resonator 502, a photodiode 504, a laser 506, a taper 508, an optical modulator 510, a waveguide 512, a coupler 514, a coupler 516, a photonic crystal 518, optical fiber 520, and/or a photodiode 522. Similarly, as illustrated in FIG. 6, photonic components 600 may include and/or represent an optical coupler 602, a waveguide 604, a directional coupler 606, an MZI device 608, and/or a splitter 610.

In some examples, optical core 102 may be configured to generate, transmit, and/or carry electromagnetic radiation. For example, optical core 102 may generate, transmit, and/or carry radiation of wavelengths in the visible and near infrared spectrums. In one example, optical core 102 may have a thickness that is substantially equal and/or similar to a wavelength of the electromagnetic radiation being generated, transmitted, and/or carried.

In some examples, PIC 100 may be coupled and/or disposed on an optical element. In such examples, optical core 102 of PIC 100 may be grown, deposited, patterned, laminated, or etched along the contoured surface of the optical element. Examples of such an optical element include, without limitation, lenses, glass components, plastic components, compensators, mirrors, retarders, polarizers, combinations or variations of one or more of the same, and/or any other suitable optical components. In one example, the optical element may have one or more non-planar, contoured, and/or curved surfaces. In this example, PIC 100 may be coupled to and/or disposed on one of the nonplanar, contoured, and/or curved surfaces of the optical element. By doing so, PIC 100 may be shaped and/or contoured to the curvature of that surface on the optical element. PIC 100 may achieve and/or support this shaping and/or contouring due at least in part to the optically anisotropic organic material. For example, the optical core may be grown, deposited, patterned, laminated, or etched along the contoured surface of an optical element.

Figure 4:
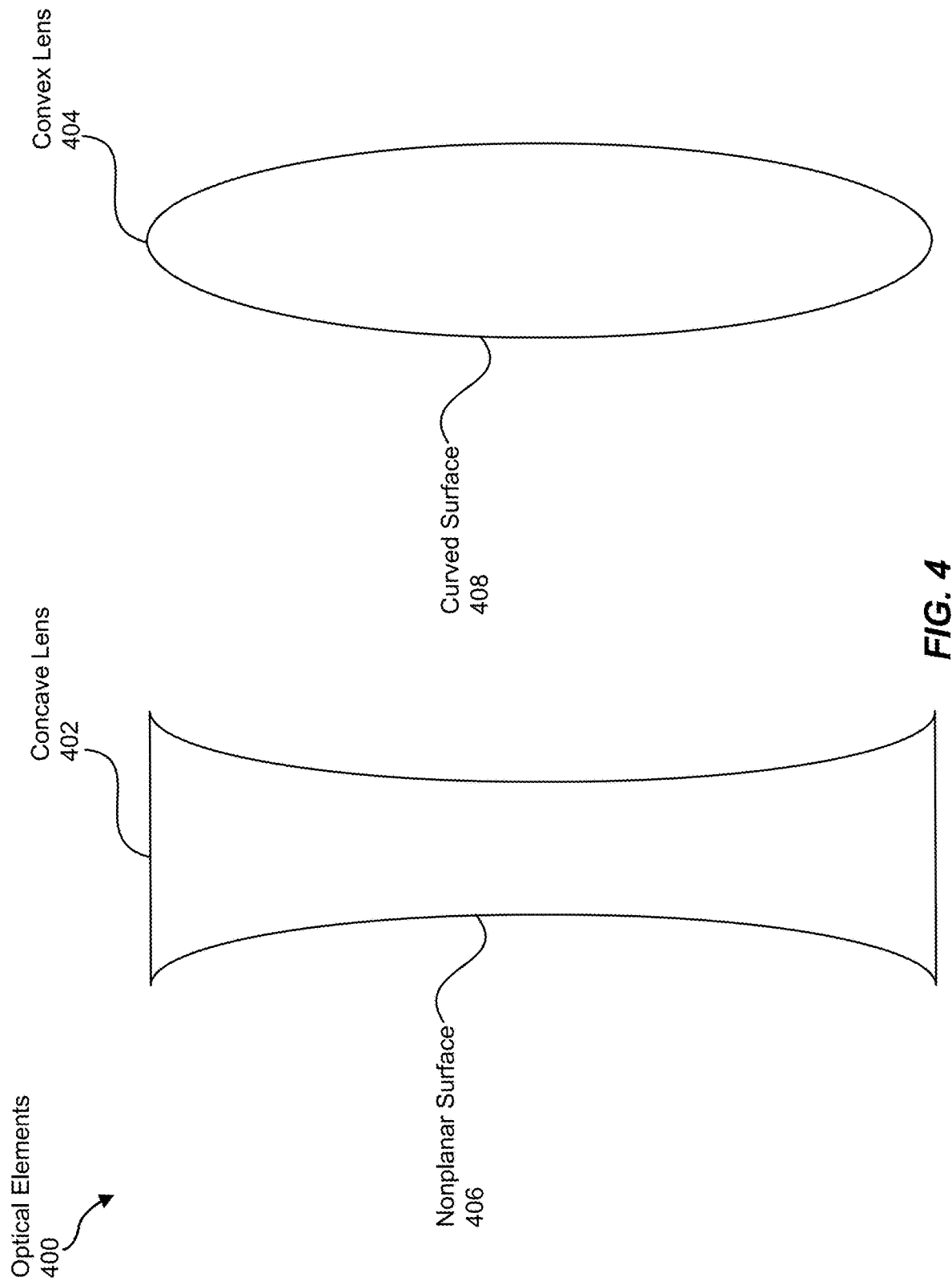
FIG. 4 is an illustration of exemplary optical elements that include concave and convex lenses according to one or more embodiments of this disclosure.

FIG. 4 illustrates optical components 400 that include and/or represent a concave lens 402 and/or a convex lens 404. As illustrated in FIG. 4, concave lens 402 may include and/or represent a nonplanar surface 406 that is concavely shaped and/or curved. In contrast, convex lens 404 may include and/or represent a curved surface 408 that is convexly shaped and/or curved. Although concave lens 402 and convex lens 404 in FIG. 4 are illustrated as each having multiple nonplanar and/or curved surfaces, alternative embodiments of concave lens 402 and/or convex lens 404 may each have only a single nonplanar and/or curved surface.

Figure 7:
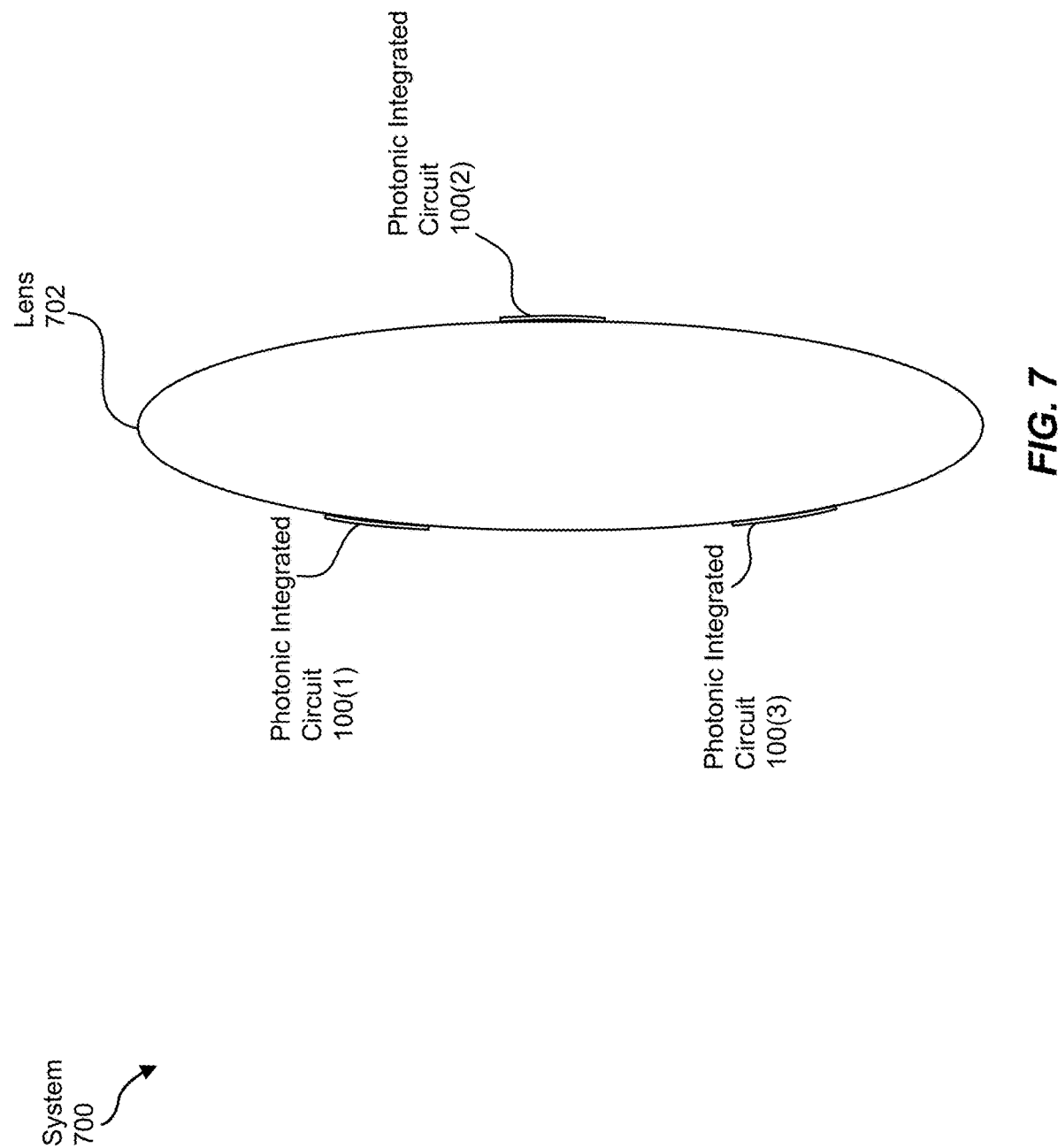
FIG. 7 is an illustration of an exemplary system involving photonic integrated circuits disposed on surfaces according to one or more embodiments of this disclosure.

In some examples, one or more PICs may be coupled to and/or disposed along a nonplanar surface (e.g., a convex surface, a concave surface, and/or a Fresnel pattern) of a shaped and/or contoured lens. FIG. 7 illustrates a system 700 that includes and/or represents PICs 100(1), 100(2), and 100(3) coupled to and/or disposed along curved surfaces of a lens 702. In some examples, PICs 100(1)-(3) may be shaped and/or contoured to fit the curvature of the nonplanar surface on which they are disposed. In such examples, this shaping and/or contouring of PICs 100(1)-(3) may be achieved and/or supported by an optically anisotropic organic material incorporated in PICs 100(1)-(3). Accordingly, the optically anisotropic organic material may facilitate and/or support conformability and/or flexibility in PICs 100(1)-(3).

Figure 9:
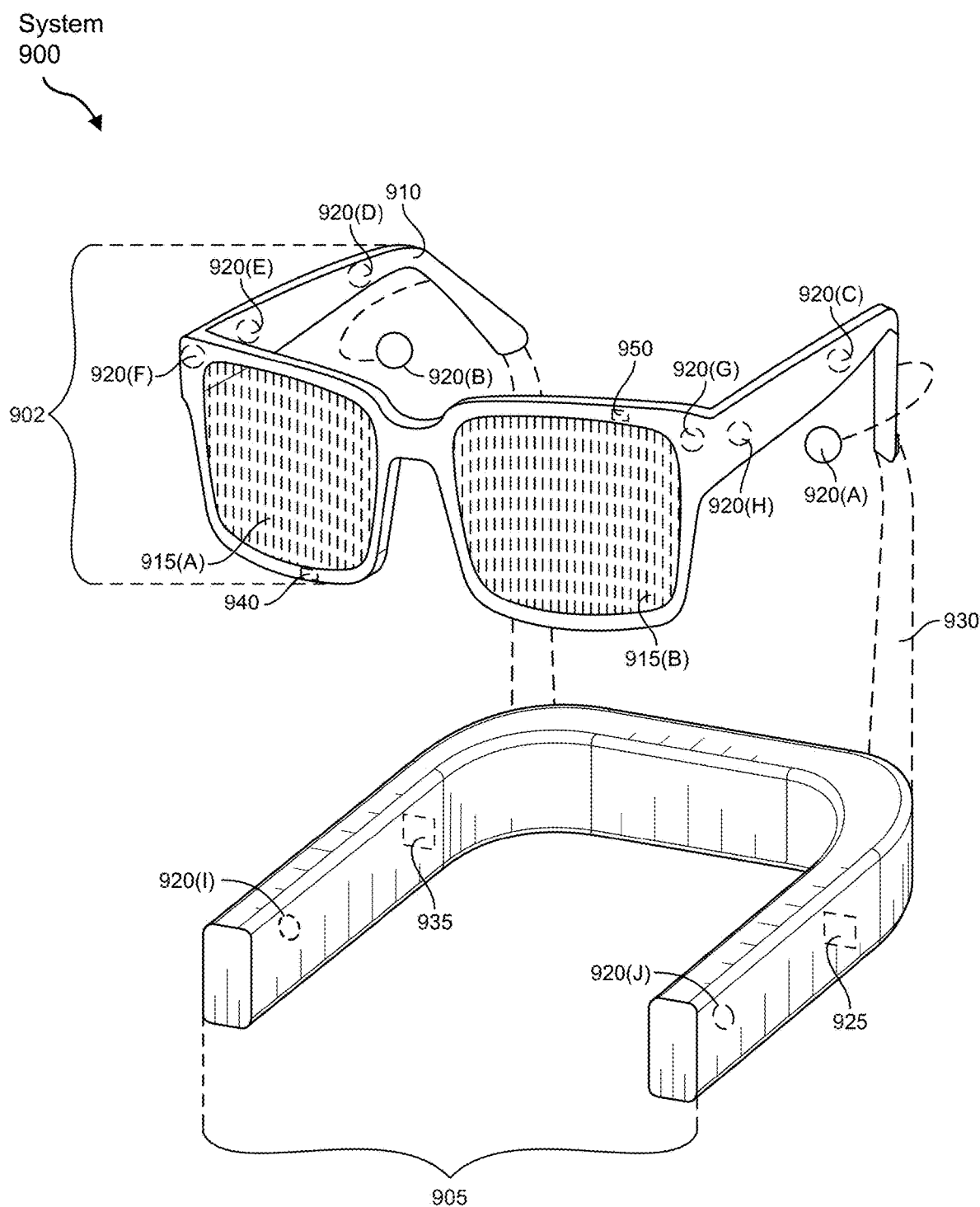
FIG. 9 is an illustration of exemplary augmented-reality glasses that may be used in connection with embodiments of this disclosure.
Figure 10:
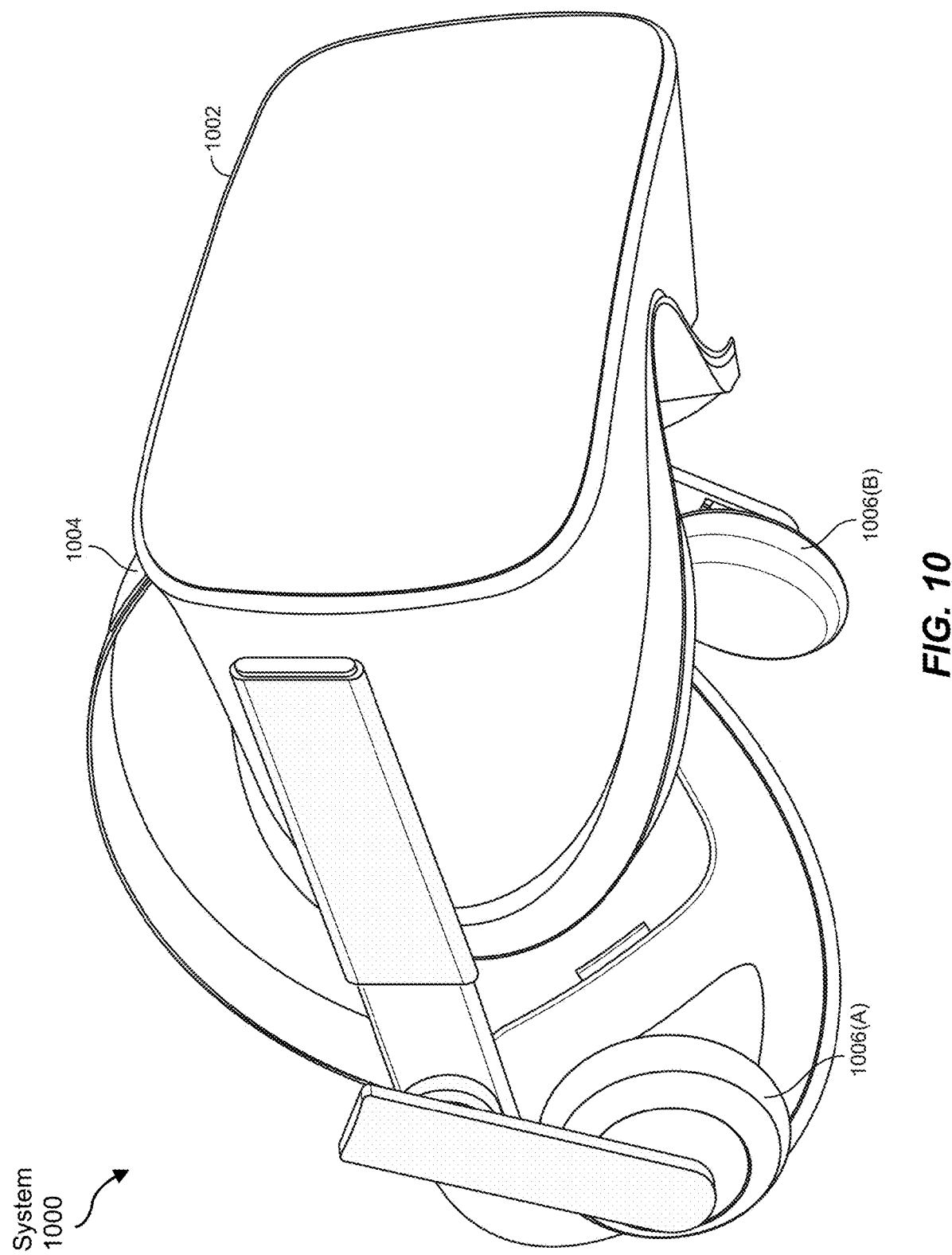
FIG. 10 is an illustration of an exemplary virtual-reality headset that may be used in connection with embodiments of this disclosure.

In some examples, lenses on which PICs are disposed may be incorporated in a head-mounted display (such as a display device included in system 900 in FIG. 9 and/or system 1000 in FIG. 10). In such examples, the head-mounted display may be dimensioned to be worn by a user of an artificial-reality system. In one example, the PICs disposed on the lenses may perform and/or provide one or more photonic functions in connection with the head-mounted display. For example, a PIC disposed on a lens of the head-mounted display may include and/or represent a light-emitting device configured to illuminate an area within the line of sight of the user of the artificial-reality system as the user operates the head-mounted display. In this example, the light-emitting device may constitute, represent, and/or provide one or more pixels of virtual graphics and/or images displayed and/or overlaid by the head-mounted display for viewing by the user.

As another example, a PIC disposed on a lens of the head-mounted display may include and/or represent an eye-tracking device (such as a tracking device included in system 1100 in FIG. 11 and/or subsystem 1200 in FIG. 12) configured to track a gaze of the user of the artificial-reality system as the user operates the head-mounted display. In this example, the eye-tracking device may deliver and/or provide information indicative of the user's gaze to the artificial-reality system to facilitate modifying one or more virtual graphics and/or images displayed and/or overlaid by the head-mounted display based at least in part on the user's gaze.

Figure 8:
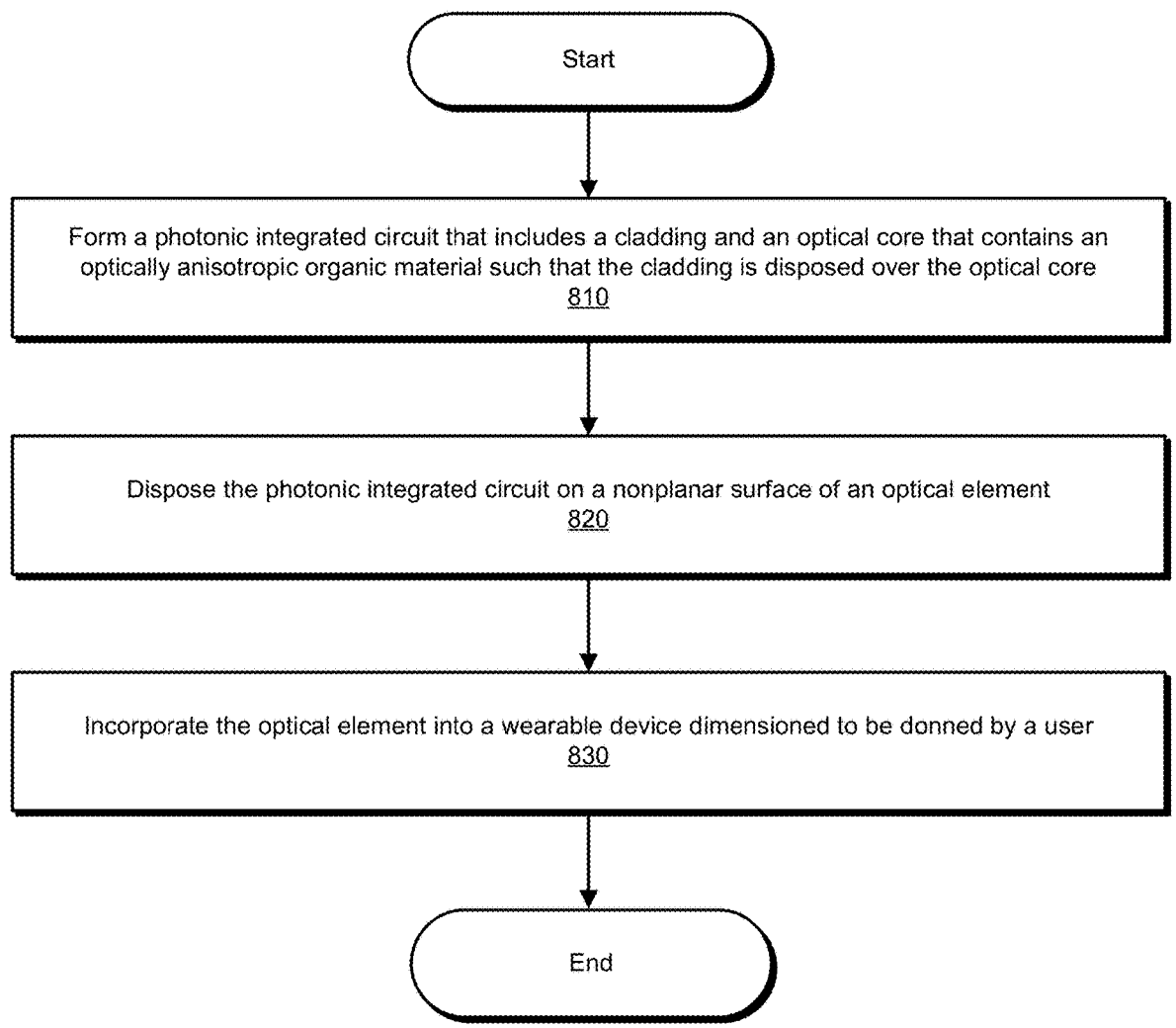
FIG. 8 is a flowchart of an exemplary method for disposing photonic integrated circuits on surfaces according to one or more embodiments of this disclosure.

FIG. 8 is a flow diagram of an exemplary method 800 for disposing photonic integrated circuits on nonplanar surfaces. In one example, the steps shown in FIG. 8 may be performed during assembly and/or manufacture of wearable devices (such as head-mounted displays and/or VR or AR eyewear) that include PICs disposed on curved lenses. Additionally or alternatively, the steps shown in FIG. 8 may also incorporate and/or involve various sub-steps and/or variations consistent with the descriptions provided above in connection with FIGS. 1-7.

As illustrated in FIG. 8, method 800 may include and/or involve the step of forming a PIC that includes a cladding and/or an optical core that contains an optically anisotropic organic material (810). Step 810 may be performed in a variety of ways, including any of those described above in connection with FIGS. 1-7. For example, a wearable equipment manufacturer and/or contractor may form a PIC that includes a cladding and an optical core that contains an optically anisotropic organic material. In this example, the wearable equipment manufacturer and/or contractor may dispose the cladding over the optical core.

Method 800 may also include the step of disposing the PIC on a nonplanar surface of an optical element (820). Step 820 may be performed in a variety of ways, including any of those described above in connection with FIGS. 1-7. For example, a wearable equipment manufacturer and/or contractor may couple and/or dispose the PIC on a curved surface of a lens. In this example, the curved surface of the lens may include and/or represent a convex surface, a concave surface, and/or a Fresnel pattern.

Method 800 may further include the step of incorporating the optical element into a wearable device dimensioned to be donned by a user (830). Step 830 may be performed in a variety of ways, including any of those described above in connection with FIGS. 1-7. For example, a wearable equipment manufacturer and/or contractor may incorporate the optical element into a wearable device dimensioned to be donned by a user. In this example, the PIC disposed on the optical element incorporated into the wearable device may perform one or more photonic functions in connection with an artificial-reality environment supported by the wearable device.

EXAMPLE EMBODIMENTS

Example 1: A system comprising (1) at least one optical element having a nonplanar surface, (2) at least one photonic integrated circuit disposed on the nonplanar surface of the optical element, the photonic integrated circuit comprising: (A) an optical core that contains an optically anisotropic organic material and (B) a cladding disposed over the optical core.

Example 2: The system of Example 1, wherein the cladding of the photonic integrated circuit contains an optically anisotropic organic material.

Example 3: The system of Example 1 or 2, wherein the optically anisotropic organic material comprises at least one of (1) a uniaxially-oriented index of refraction or (2) a biaxially-oriented index of refraction.

Example 4: The system of any of Examples 1-3, wherein the optical core (1) is configured to transmit electromagnetic radiation and (2) has a thickness that is substantially equal to a wavelength of the electromagnetic radiation.

Example 5: The system of any of Examples 1-4, wherein (1) the cladding of the photonic integrated circuit has a refractive index and (2) the optical core of the photonic integrated circuit has a refractive index that is greater than the refractive index of the cladding.

Example 6: The system of any of Examples 1-5, wherein the core and the cladding together constitute at least one of (1) a passive component of the photonic integrated circuit and (2) an active component of the photonic integrated circuit.

Example 7: The system of any of Examples 1-6, wherein the passive component of the photonic integrated circuit comprises at least one of a waveguide, a crossing structure, a taper, a directional coupler, a beam splitter, or a grating.

Example 8: The system of any of Examples 1-7, wherein the active component of the photonic integrated circuit comprises at least one of an optical modulator, a phase shifter, or an optical switch or gate.

Example 9: The system of any of Examples 1-8, wherein the optical element comprises a lens having a curved surface, the photonic integrated circuit being disposed on the curved surface of the lens.

Example 10: The system of any of Examples 1-9, further comprising a head-mounted display dimensioned to be worn by a user of an artificial-reality system, wherein the head-mounted display incorporates the lens and the photonic integrated circuit disposed on the lens.

Example 11: The system of any of Examples 1-10, wherein the head-mounted display comprises an eye-tracking device configured to track a gaze of the user of the artificial-reality system as the user operates the head-mounted display, the eye-tracking device incorporating the photonic integrated circuit disposed on the lens.

Example 12: The system of any of Examples 1-11, wherein the head-mounted display comprises a light-emitting device configured to illuminate an area within a line of sight of the user of the artificial-reality system as the user operates the head-mounted display, the light-emitting device incorporating the photonic integrated circuit disposed on the lens.

Example 13: The system of any of Examples 1-12, wherein the optically anisotropic organic material has a refractive index of at least 1.9.

Example 14: The system of any of Examples 1-13, wherein the optically anisotropic organic material has a birefringence of at least 0.15.

Example 15: The system of any of Examples 1-14, wherein (1) the nonplanar surface comprises a contoured surface of the optical element and (2) the optical core is patterned or etched along the contoured surface of the optical element.

Example 16: The system of any of Examples 1-15, wherein the contoured surface comprises at least one of a convex surface of the optical element, a concave surface of the optical element, or a Fresnel pattern of the optical element.

Example 17: The system of any of Examples 1-16, wherein the optically anisotropic organic material comprises an organic solid crystal material.

Example 18: A photonic integrated circuit comprising (1) an optical core that contains an optically anisotropic organic material and (2) a cladding that is (A) disposed over the optical core and (B) coupled to a nonplanar surface of an optical element.

Example 19: The photonic integrated circuit of Example 18, wherein the cladding of the photonic integrated circuit contains an optically anisotropic organic material.

Example 20: A method comprising (1) forming a photonic integrated circuit that includes a cladding and an optical core that contains an optically anisotropic organic material, wherein forming the photonic integrated circuit comprises disposing the cladding over the optical core, (2) disposing the photonic integrated circuit on a nonplanar surface of an optical element, and (3) incorporating the optical element into a wearable device dimensioned to be donned by a user.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 900 in FIG. 9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920 (G), and 920(H), which may be positioned at various locations on frame 910, and/or acoustic transducers 920(I) and 920(J), which may be positioned on a corresponding neckband 905.

In some embodiments, one or more of acoustic transducers 920(A)-(J) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality device 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a BLUETOOTH connection). In still other embodiments, acoustic transducers 920(A) and 920(B) may not be used at all in conjunction with augmented-reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(I) and 920(J)) that are part of the microphone array (or potentially form their own microphone subarray). Neckband 905 may also include a controller 925 and a power source 935.

Acoustic transducers 920(I) and 920(J) of neckband 905 may be configured to detect sound and convert the detected sound into an electronic format (analog or digital). In the embodiment of FIG. 9, acoustic transducers 920(I) and 920(J) may be positioned on neckband 905, thereby increasing the distance between the neckband acoustic transducers 920(I) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920(D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

In some embodiments, the systems described herein may also include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

FIG. 11 is an illustration of an exemplary system 1100 that incorporates an eye-tracking subsystem capable of tracking a user's eye(s). As depicted in FIG. 11, system 1100 may include a light source 1102, an optical subsystem 1104, an eye-tracking subsystem 1106, and/or a control subsystem 1108. In some examples, light source 1102 may generate light for an image (e.g., to be presented to an eye 1101 of the viewer). Light source 1102 may represent any of a variety of suitable devices. For example, light source 1102 can include a two-dimensional projector (e.g., a LCoS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, optical subsystem 1104 may receive the light generated by light source 1102 and generate, based on the received light, converging light 1120 that includes the image. In some examples, optical subsystem 1104 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 1120. Further, various mechanical couplings may serve to maintain the relative spacing and/or the orientation of the optical components in any suitable combination.

In one embodiment, eye-tracking subsystem 1106 may generate tracking information indicating a gaze angle of an eye 1101 of the viewer. In this embodiment, control subsystem 1108 may control aspects of optical subsystem 1104 (e.g., the angle of incidence of converging light 1120) based at least in part on this tracking information. Additionally, in some examples, control subsystem 1108 may store and utilize historical tracking information (e.g., a history of the tracking information over a given duration, such as the previous second or fraction thereof) to anticipate the gaze angle of eye 1101 (e.g., an angle between the visual axis and the anatomical axis of eye 1101). In some embodiments, eye-tracking subsystem 1106 may detect radiation emanating from some portion of eye 1101 (e.g., the cornea, the iris, the pupil, or the like) to determine the current gaze angle of eye 1101. In other examples, eye-tracking subsystem 1106 may employ a wavefront sensor to track the current location of the pupil.

Any number of techniques can be used to track eye 1101. Some techniques may involve illuminating eye 1101 with infrared light and measuring reflections with at least one optical sensor that is tuned to be sensitive to the infrared light. Information about how the infrared light is reflected from eye 1101 may be analyzed to determine the position(s), orientation(s), and/or motion(s) of one or more eye feature (s), such as the cornea, pupil, iris, and/or retinal blood vessels.

In some examples, the radiation captured by a sensor of eye-tracking subsystem 1106 may be digitized (i.e., converted to an electronic signal). Further, the sensor may transmit a digital representation of this electronic signal to one or more processors (for example, processors associated with a device including eye-tracking subsystem 1106). Eye-tracking subsystem 1106 may include any of a variety of sensors in a variety of different configurations. For example, eye-tracking subsystem 1106 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 1106 to track the movement of eye 1101. In another example, these processors may track the movements of eye 1101 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 1106 may be programmed to use an output of the sensor(s) to track movement of eye 1101. In some embodiments, eye-tracking subsystem 1106 may analyze the digital representation generated by the sensors to extract eye rotation information from changes in reflections. In one embodiment, eye-tracking subsystem 1106 may use corneal reflections or glints (also known as Purkinje images) and/or the center of the eye's pupil 1122 as features to track over time.

In some embodiments, eye-tracking subsystem 1106 may use the center of the eye's pupil 1122 and infrared or near-infrared, non-collimated light to create corneal reflections. In these embodiments, eye-tracking subsystem 1106 may use the vector between the center of the eye's pupil 1122 and the corneal reflections to compute the gaze direction of eye 1101. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 1106 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 1101 may act as a retroreflector as the light reflects off the retina, thereby creating a bright pupil effect similar to a red-eye effect in photography. If the illumination source is offset from the optical path, then the eye's pupil 1122 may appear dark because the retroreflection from the retina is directed away from the sensor. In some embodiments, bright-pupil tracking may create greater iris/ pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 1108 may control light source 1102 and/or optical subsystem 1104 to reduce optical aberrations (e.g., chromatic aberrations and/or monochromatic aberrations) of the image that may be caused by or influenced by eye 1101. In some examples, as mentioned above, control subsystem 1108 may use the tracking information from eye-tracking subsystem 1106 to perform such control. For example, in controlling light source 1102, control subsystem 1108 may alter the light generated by light source 1102 (e.g., by way of image rendering) to modify (e.g., pre-distort) the image so that the aberration of the image caused by eye 1101 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

FIG. 12 is a more detailed illustration of various aspects of the eye-tracking subsystem illustrated in FIG. 11. As shown in this figure, an eye-tracking subsystem 1200 may include at least one source 1204 and at least one sensor 1206. Source 1204 generally represents any type or form of element capable of emitting radiation. In one example, source 1204 may generate visible, infrared, and/or near-infrared radiation. In some examples, source 1204 may radiate non-collimated infrared and/or near-infrared portions of the electromagnetic spectrum towards an eye 1202 of a user. Source 1204 may utilize a variety of sampling rates and speeds. For example, the disclosed systems may use sources with higher sampling rates in order to capture fixational eye movements of a user's eye 1202 and/or to correctly measure saccade dynamics of the user's eye 1202. As noted above, any type or form of eye-tracking technique may be used to track the user's eye 1202, including optical-based eye-tracking techniques, ultrasound-based eye-tracking techniques, etc.

Sensor 1206 generally represents any type or form of element capable of detecting radiation, such as radiation reflected off the user's eye 1202. Examples of sensor 1206 include, without limitation, a charge coupled device (CCD), a photodiode array, a complementary metal-oxide-semiconductor (CMOS) based sensor device, and/or the like. In one example, sensor 1206 may represent a sensor having predetermined parameters, including, but not limited to, a dynamic resolution range, linearity, and/or other characteristic selected and/or designed specifically for eye tracking.

As detailed above, eye-tracking subsystem 1200 may generate one or more glints. As detailed above, a glint 1203 may represent reflections of radiation (e.g., infrared radiation from an infrared source, such as source 1204) from the structure of the user's eye. In various embodiments, glint 1203 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 12 shows an example image 1205 captured by an eye-tracking subsystem, such as eye-tracking subsystem 1200. In this example, image 1205 may include both the user's pupil 1208 and a glint 1210 near the same. In some examples, pupil 1208 and/or glint 1210 may be identified using an artificial-intelligence-based algorithm, such as a computer-vision-based algorithm. In one embodiment, image 1205 may represent a single frame in a series of frames that may be analyzed continuously in order to track the eye 1202 of the user. Further, pupil 1208 and/or glint 1210 may be tracked over a period of time to determine a user's gaze.

In one example, eye-tracking subsystem 1200 may be configured to identify and measure the inter-pupillary distance (IPD) of a user. In some embodiments, eye-tracking subsystem 1200 may measure and/or calculate the IPD of the user while the user is wearing the artificial reality system. In these embodiments, eye-tracking subsystem 1200 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's inter-pupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various artificial reality systems described herein in a variety of ways. For example, one or more of the various components of system 1100 and/or eye-tracking subsystem 1200 may be incorporated into augmented-reality system 900 in FIG. 9 and/or virtual-reality system 1000 in FIG. 10 to enable these systems to perform various eye-tracking tasks (including one or more of the eye-tracking operations described herein).

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:
1. A system comprising:
   at least one optical element; and
   at least one photonic integrated circuit that is grown on a nonplanar surface of the optical element, the photonic integrated circuit comprising:

an optical core that contains at least one optically anisotropic organic crystal that:
  includes closely packed molecules;
  exhibits a tunable refractive index; and
  exhibits a tunable birefringence; and
a cladding disposed over the optical core.

2. The system of claim 1, wherein the cladding of the photonic integrated circuit contains an optically anisotropic organic material.

3. The system of claim 1, wherein the at least one optically anisotropic organic crystal comprises at least one of:
  a uniaxially-oriented index of refraction; or
  a biaxially-oriented index of refraction.

4. The system of claim 1, wherein the optical core:
  is configured to transmit electromagnetic radiation; and
  has a thickness that is substantially equal to a wavelength of the electromagnetic radiation.

5. The system of claim 1, wherein the optical core of the photonic integrated circuit has a refractive index that is greater than a refractive index of the cladding.

6. The system of claim 1, wherein the optical core and the cladding together constitute at least one of:
  a passive component of the photonic integrated circuit; and
  an active component of the photonic integrated circuit.

7. The system of claim 6, wherein the passive component of the photonic integrated circuit comprises at least one of:
  a waveguide;
  a crossing structure;
  a taper;
  a directional coupler;
  a beam splitter; or
  a grating.

8. The system of claim 6, wherein the active component of the photonic integrated circuit comprises at least one of:
  an optical modulator;
  a phase shifter; or
  an optical switch or gate.

9. The system of claim 1, wherein the nonplanar surface of the optical element comprises a curved surface of a lens, the photonic integrated circuit being disposed on the curved surface of the lens.

10. The system of claim 9, further comprising a head-mounted display dimensioned to be worn by a user of an artificial-reality system, wherein the head-mounted display incorporates the lens and the photonic integrated circuit disposed on the lens.

11. The system of claim 10, wherein the head-mounted display comprises an eye-tracking device configured to track a gaze of the user of the artificial-reality system as the user operates the head-mounted display, the eye-tracking device incorporating the photonic integrated circuit disposed on the lens.

12. The system of claim 10, wherein the head-mounted display comprises a light-emitting device configured to illuminate an area within a line of sight of the user of the artificial-reality system as the user operates the head-mounted display, the light-emitting device incorporating the photonic integrated circuit disposed on the lens.

13. The system of claim 1, wherein the at least one optically anisotropic organic crystal has a refractive index of at least 1.9.

14. The system of claim 1, wherein the at least one optically anisotropic organic crystal has a birefringence of at least 0.05.

15. The system of claim 1, wherein:
  the nonplanar surface comprises a contoured surface of the optical element; and
  the optical core is grown along the contoured surface of the optical element.

16. The system of claim 15, wherein the contoured surface comprises at least one of:
  a convex surface of the optical element; or
  a concave surface of the optical element.

17. The system of claim 1, wherein the cladding comprises one or more cladding layers that surround all sides of the optical core.

18. A photonic integrated circuit comprising:
  an optical core that contains at least one optically anisotropic organic crystal that:
    is grown on a nonplanar surface of an optical element;
    includes closely packed molecules;
    exhibits a tunable refractive index; and
    exhibits a tunable birefringence; and
  a cladding that is disposed over the optical core.

19. The photonic integrated circuit of claim 18, wherein the optical core has a refractive index that is greater than a refractive index of the cladding.

20. A method comprising:
  growing, on a nonplanar surface of an optical element, a photonic integrated circuit that includes a cladding and an optical core that contains at least one optically anisotropic organic crystal that:
    includes closely packed molecules;
    exhibits a tunable refractive index; and
    exhibits a tunable birefringence;
  disposing the cladding over the optical core; and
  incorporating the optical element and the photonic integrated circuit grown on the optical element into a wearable device dimensioned to be donned by a user.

* * * * *